(No Model.)

P. F. SEIDEL.
HOG SCALDING AND SCRAPING MACHINE.

No. 329,683. Patented Nov. 3, 1885.

Witnesses
Wm. A. Rosenbaum
Frank S. Ober

Inventor:
Peter F. Seidel
by V. D. Stockbridge
Atty.

N. PETERS, Photo-Lithographer, Washington, D. C.

UNITED STATES PATENT OFFICE.

PETER F. SEIDEL, OF PINE GROVE, PENNSYLVANIA.

HOG SCALDING AND SCRAPING MACHINE.

SPECIFICATION forming part of Letters Patent No. 329,683, dated November 3, 1885.

Application filed February 28, 1885. Serial No. 157,362. (No model.)

*To all whom it may concern:*

Be it known that I, PETER F. SEIDEL, a citizen of the United States, residing at Pine Grove, in the county of Schuylkill and State of Pennsylvania, have invented certain new and useful Improvements in Hog Scalding and Scraping Machines; and I do hereby declare the following to be a full, clear, and exact description of the invention, such as will enable others skilled in the art to which it appertains to make and use the same.

My invention relates to apparatus for scalding and scraping hogs; and its object is to provide a machine in which these two operations may be carried on simultaneously, thus providing for scraping and removing the bristles as soon as they are loosened under and during the application of the heat, thereby securing great economy in heat and time, as well as dispensing with one machine; and to this end my invention consists in the combination of a scalding-tank and a series of roughened rollers for scraping and cleaning the outside of the body.

It also consists in the combination, with a scalding-tank and scraping-rollers, of a cradle for removing the body from the tank.

It also consists in the combination of a series of scraping-rollers geared together so that one or more will be driven with a different circumferential speed from the others.

It also consists in the combination, with the tank and rollers, of a cradle flexibly connected with the tank.

It also consists in the combination of rollers and tank provided with a trough for bristles, &c.

Figure 1:
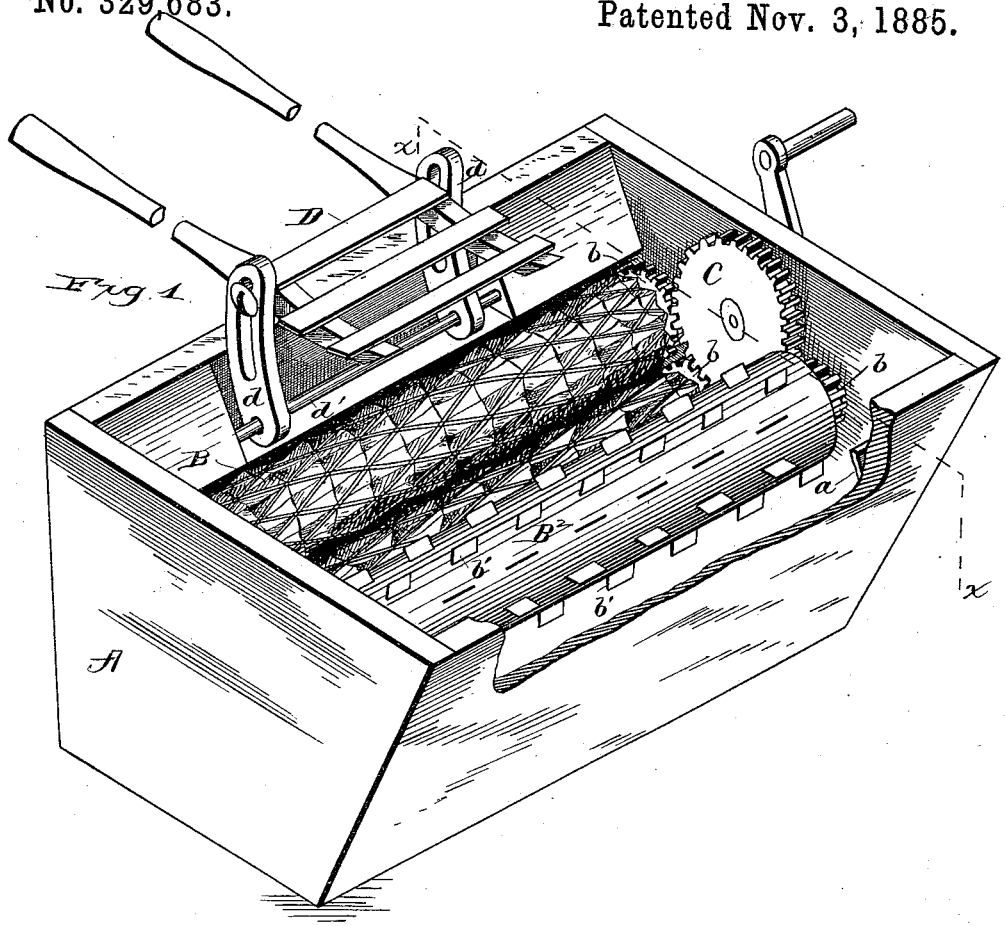
Figure 2:
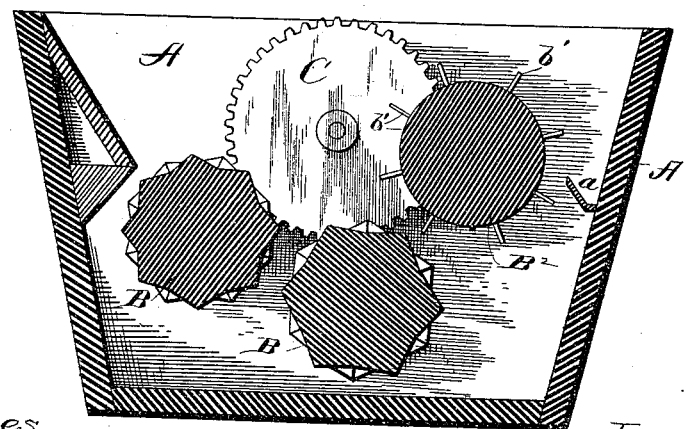

In the drawings, Figure 1 is a perspective of my improved apparatus, showing the relative arrangement of all the parts thereof. Fig. 2 is a section of the same on the plane $x$ $x$ of Fig. 1.

A is the tank, which may be made of any suitable material. It may be made of metal and mounted in masonry or in any other suitable way over a furnace, or it may be a wooden tank receiving the hot water from any source or having its contents heated by a steam-pipe.

B B $B^2$ are rollers mounted within the tank A upon suitable supports below the water-line, or their shafts may extend for bearings into the walls of the tank, as shown. These rollers are corrugated or roughened, as shown, or in any other suitable manner, to provide scraping edges and points. Each of these rollers is provided with pinions or gearing $b$ $b$ $b$, preferably of different diameters, which are geared or mesh with a driving-wheel, C, mounted on a shaft extending outside the tank, to be driven by power or hand, as may be desired. The surface of the rollers are thus caused to move with varying velocities, and a continual scraping results as the hog is rolled over and over. The scraping-roller $B^2$ is provided with projecting blades $b'$, for scraping and cleaning the body; and opposite the outer side of this roller there is provided along the side of the tank a trough, $a$, to receive the bristles and other solid materials removed from the body by the scrapers. A cradle, D, is mounted at one side of the tank in slotted links $d$ $d$, flexibly mounted on a rod, $d'$. This cradle serves the double function of lifting the body from the tank and as a lever to press down upon the body and force it against the rollers.

It should be observed that the series of scraping-rollers, one or more of which move at a different speed from the others, may be usefully employed for scraping the body, whether combined with the tank or not.

Having now described my invention, what I claim, and desire to secure by Letters Patent, is—

1. In a hog scalding and scraping machine, the combination, with the scalding-tank, of rollers and scrapers so disposed within the tank below the water-line as to support and operate on the body of a hog, substantially as described.

2. In a hog scalding and scraping machine, the combination, with the scalding-tank, of a plurality of scraping-rollers so disposed within the tank and below the water-line as to support and operate on the body of a hog, substantially as described.

3. The combination of a scalding-tank, scraping-rollers arranged therein below the water-line, and a cradle or skid for pressing down upon the body and removing the same from the tank, as set forth.

4. The combination of the scalding-tank and a plurality of scraping-rollers geared together and arranged substantially as described, whereby they are driven with different circumferential speeds and operate upon the body of a hog, as described.

5. The combination of a tank, scraping-rollers arranged below the water-line thereof, and a cradle or skid flexibly connected with the tank, as and for the purpose set forth.

6. The combination of scraping-rollers with a tank provided with a trough or receptacle for catching bristles or other solid matter, as set forth.

7. The combination of a plurality of scraping-rollers disposed, as shown, so as to form a cradle to support the body of a hog, and gearing, substantially as described, for driving one or more of said rollers at a different speed from the others, as specified.

In testimony whereof I affix my signature in presence of two witnesses.

PETER F. SEIDEL.

Witnesses:
ABRAHAM BOWMAN,
CHAS. A. SEIDEL.